(No Model.)
J. J. REILLY.
VALVE.
No. 461,275. Patented Oct. 13, 1891.
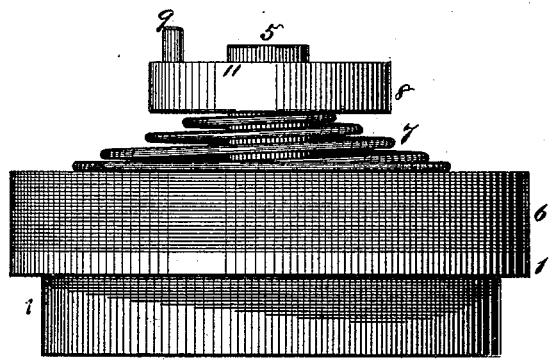
Fig. I.
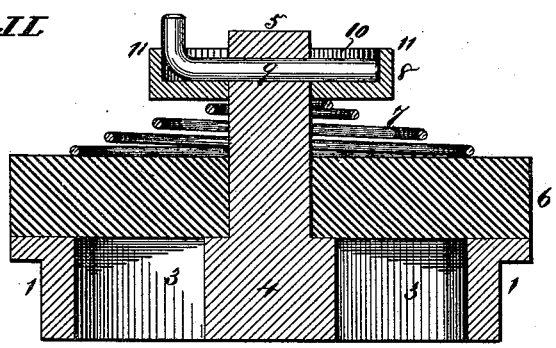
Fig. II.
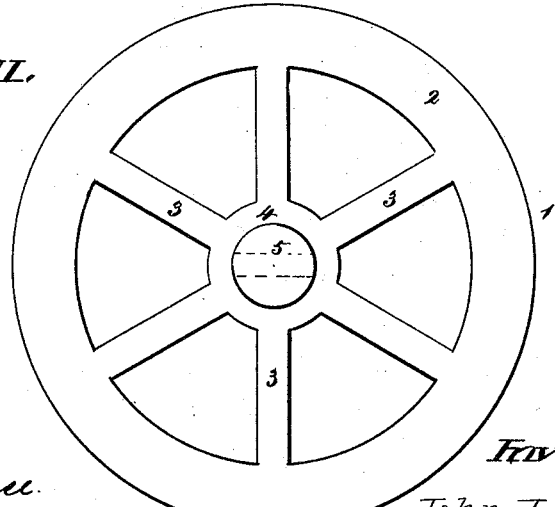
Fig. III.
Attest:
Geo. E. Cruse
Harry D. Rohrer
Inventor:
John J. Reilly.
By Knight Bro.
Attys.

UNITED STATES PATENT OFFICE.

JOHN J. REILLY, OF ST. LOUIS, MISSOURI.

VALVE.

SPECIFICATION forming part of Letters Patent No. 461,275, dated October 13, 1891.

Application filed May 15, 1891. Serial No. 392,929. (No model.)

*To all whom it may concern:*

Be it known that I, JOHN J. REILLY, of the city of St. Louis, in the State of Missouri, have invented a certain new and useful Improvement in Valves, of which the following is a full, clear, and exact description, reference being had to the accompanying drawings, forming part of this specification.

This is a cheap and effective form of valve. There is a central guide-stud for the valve, preferably cast integral with the seat, and which carries a recessed washer that bears upon a spring interposed between the washer and the valve. The washer is held on the stud by a pin passing through the stud and resting in a recess of the washer.

Figure I is a side view of the valve. Fig. II is an axial section of the same. Fig. III is a top view of the valve-seat.

The seat is preferably made of cast metal. It has a circular part or ring 1, whose top forms the seat proper 2. Arms 3 connect the center 4 with the ring 1. From the center 4 extends upward a circular stud 5, that forms the guide of the valve 6. The valve 6 is bored centrally to fit the guide-stud, the fit being sufficiently easy to enable the valve to rise from its seat without any objectionable degree of friction. Surrounding the guide-stud is a spiral or helical spring 7, bearing at one end upon the valve and at the other against the washer 8 upon the stud. The washer is held in position by a pin 9 passing transversely through a hole in the stud and occupying a recess 10 in the washer, (see Fig. II,) the peripheral flange 11 forming the side of the recess, and by this means the pin is held in place. In order to remove the pin 9, the washer is pushed down on the stud to carry the flange 11 below the ends of the pin, when the pin may be drawn out and the washer, spring, and valve removed from the seat and guide-stud.

I claim as my invention—

The combination of the valve-seat 1 with central guide-stud 5, valve 6, working on the stud, washer 8 upon the stud, having a recess 10, pin 9, passing through a hole in the stud and resting in the recess of the washer, and spring 7 between the washer and the valve 6, substantially as set forth.

JOHN J. REILLY.

Witnesses:
SAML. KNIGHT,
BENJN. A. KNIGHT.